May 4, 1954  D. E. SUNSTEIN  2,677,763
PULSE LENGTH DISCRIMINATOR
Filed July 27, 1946
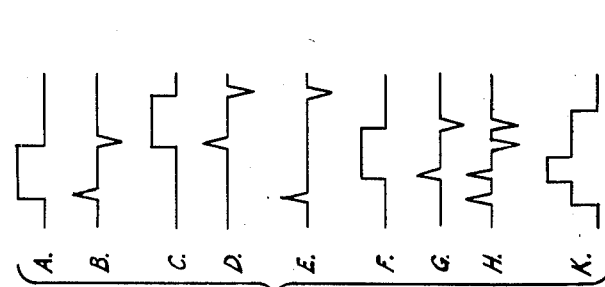
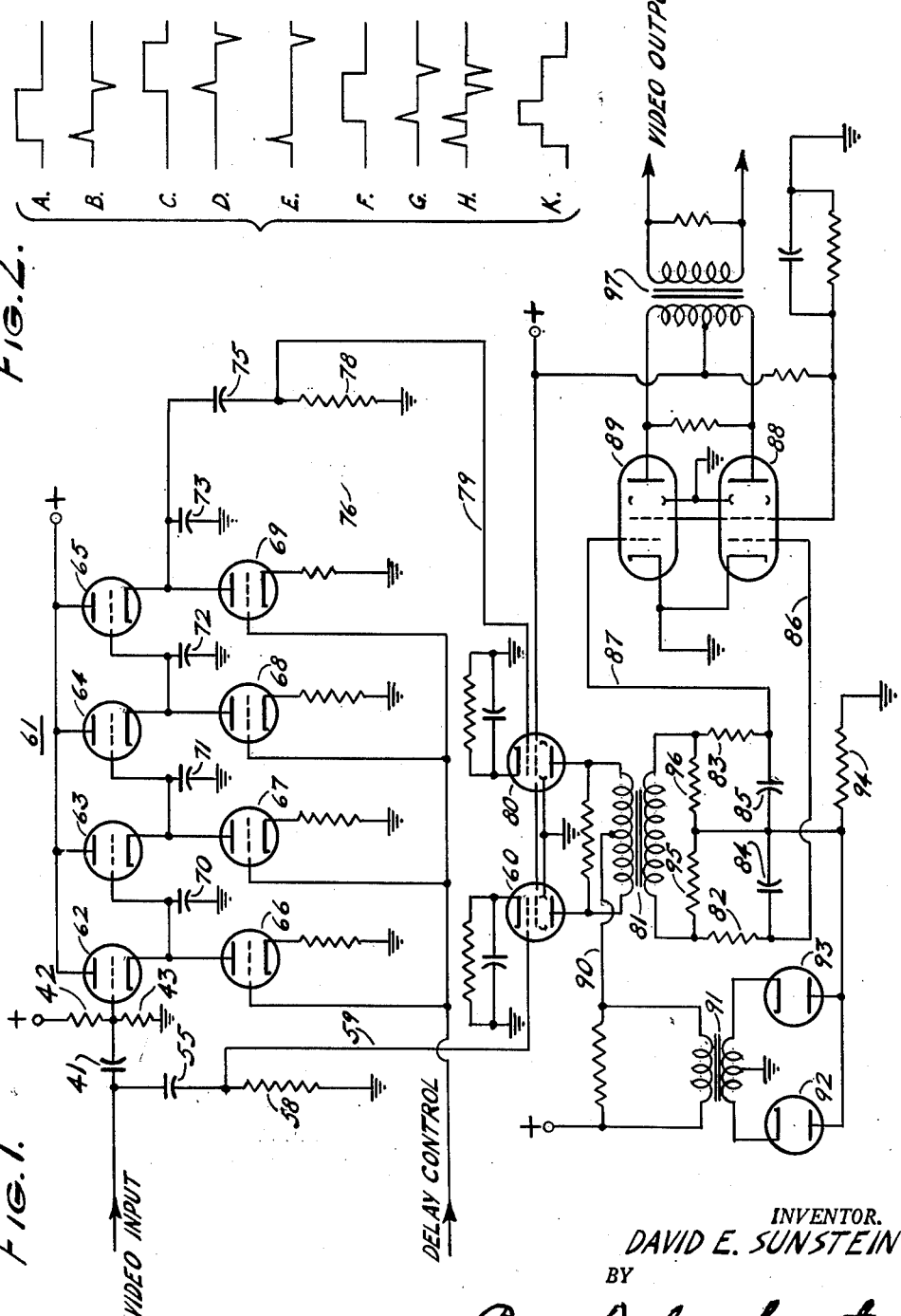
INVENTOR.
DAVID E. SUNSTEIN
BY
Brown, Denk & Synnestvedt
AGENTS Patented May 4, 1954

2,677,763

UNITED STATES PATENT OFFICE 2,677,763

PULSE LENGTH DISCRIMINATOR

David E. Sunstein, Cynwyd, Pa., assignor to Philco Corporation, Philadelphia, Pa., a corporation of Pennsylvania Application July 27, 1946, Serial No. 686,707

10 Claims. (Cl. 250—27)

This invention relates to electrical pulse signal transducers, and more specifically to transducers which can be made responsive only to pulse signals of durations between predetermined maximum and minimum limits and to transducers whose responsiveness can be varied to cause them, at different times, to respond to pulses of duration between different maximum and minimum limits.

Transducers of this sort which, for convenience, may be referred to as pulse length discriminators, are particularly useful and have varied applications in radar and like systems, as will hereinafter become apparent. For example, they may be used to provide a radar receiver which is responsive only to pulse signals of durations substantially corresponding to the durations of reflections of pulses transmitted by an associated radar transmitter. By this means interference from other nearby radars, operating on approximately the same frequency, can be substantially eliminated, and, in military application, interference caused by hostile countermeasures activities can be appreciably reduced. More particularly, if desired, the durations of transmitted pulses can be varied in random fashion with time, and the responsiveness of the receiver can be correspondingly varied to render it receptive only to pulses of duration corresponding to that of the next previously transmitted pulse. This use constitutes another invention which is fully described and claimed in my copending application, Serial Number 682,741, filed July 11, 1946, now abandoned.

As another example of their use, a radar receiver may be constructed having two separate channels. One of these may be adapted to amplify all received signals, while the other may include a fixed-duration pulse length discriminator which permits it to amplify only those received signals comprising target reflections of certain predetermined duration. The outputs from these two channels are combined to yield a resultant signal in which certain received signals are emphasized.

Still another example of their use is in a television system to select synchronizing pulses of desired duration, while excluding others of different duration as well as noise pulses of random duration.

The principal object of the invention is to provide a pulse length discriminator responsive only to pulses of duration between predetermined maximum and minimum limits.

Another object of the invention is to provide a pulse length discriminator the characteristics of which are variable in response to a control signal to cause it to respond at different times to pulses of different durations.

Another object of the invention is to provide a pulse length discriminator responsive only to pulses of duration between predetermined maximum and minimum limits, said limits being either fixed or variable, the operation of said discriminator being independent of the polarity of pulses supplied to it.

Still another object of the invention is to provide a pulse length discriminator responsive only to pulses of duration between predetermined maximum and minimum limits, said limits being either fixed or variable, in which the output amplitude is directly related to that of the input signals.

A further object of the invention is to provide a pulse length discriminator responsive only to pulses of duration between predetermined maximum and minimum limits, said limits being either fixed or variable, the operation of said discriminator in selecting pulses of desired duration being unaffected by the occurrence, either partially or entirely contemporaneously, of a plurality of input signal pulses.

Other objects and advantages of the invention will become apparent from a consideration of the following specification and of the drawings in which:

Figure 1 is a schematic diagram of a variable-duration pulse length discriminator according to the invention, and Figure 2 comprises illustrative waveforms which are referred to in explaining the operation of the invention as here embodied.

Referring now to Figure 1, video input signals, containing pulse signals of varying duration and of either polarity, are supplied to a differentiating network comprising condenser 55 and resistor 58. For purposes of explanation a positive input pulse has been assumed, although the circuit functions equally well for a negative input pulse. This differentiating circuit produces short positive and negative impulses corresponding respectively to the leading and trailing edges of positive input pulses. These impulses, developed across resistor 58, are supplied through connection 59 to the control grid of isolator tube 60.

Video input signal is also supplied through coupling condenser 41 to the input of a variable delay line 61 comprising triodes 62—69 and condensers 70—73. A voltage divider consisting of resistors 42 and 43 connected between a source of positive potential and ground is provided to determine the potential of the grid of the initial tube 62 of delay line 61. The delay line comprises, in effect, a plurality of cascaded R. C. sections, each comprising one of the condensers 70—73 and a fraction of the plate impedance of the triode, to the cathode of which the condenser is connected. The magnitude of this impedance will be inversely proportional to the mutual conductance of the triode, which, in turn, is variable throughout a relatively wide range by varying the effective plate impedance of a second triode connected in the cathode circuit of the first. Thus, for example, the delay of the section comprising tubes 63 and 67 and condenser 71 is variable by varying the potential of the grid of tube 67. Varying the potentials of the grids of each of tubes 66—69 in unison in the same sense will yield a cumulative delay of appreciable and varying magnitude throughout the several sections of the delay line. This arrangement, well known in the art, is fully described in copending application of Millard E. Ames, Jr., Serial Number 563,699, filed November 16, 1944 and assigned to the assignee of the present invention, which application also describes other equivalent arrangements which may be substituted for the one here shown. Delayed video pulses, appearing at the output of delay line 61, are differentiated in a circuit comprising condenser 75 and resistor 78. The differentiated output, which contains relatively short duration pulses corresponding to the leading and trailing edges of the delayed video input pulses, is supplied through connection 79 to the control grid of a second isolator tube 80. The two isolator tubes 60 and 80 are connected to operate in push-pull with a common load impedance comprising the primary winding of transformer 81. In the embodiment shown, these tubes are beam-power tubes of the 6AG7 type, which were chosen, because of their large power capabilities, to insure substantially complete elimination of all video pulses of other than desired duration. The choice in this respect is admittedly conservative, and it is quite likely that somewhat smaller tubes would yield satisfactory results. Pulses corresponding to the leading and trailing edges of both delayed and undelayed video pulses appearing in the output isolator tubes 60 and 80 are supplied through an R. C. delay circuit, comprising resistors 82 and 83 and condensers 84 and 85, and through connections 86 and 87 to the grids of push-pull amplifier tubes 88 and 89.

Unless received pulses are delayed in delay line 61 by an amount substantially corresponding to their duration, there will appear at the center tap of the primary winding of transformer 81, four separate time-spaced pulses of positive and negative polarity corresponding to the leading and trailing edges of the delayed and undelayed video pulses. These are applied through connection 90 and transformer 91 to a full-wave rectifier circuit comprising diodes 92 and 93 to develop across resistor 94 a negative biasing voltage which is applied through resistors 95, 96, 82 and 83 and connections 86 and 87 to the control grids of tubes 88 and 89 to bias them to cut-off, and thereby prevent the transmission to their output circuit of any signal supplied to their control grids from the output circuits of tubes 60 and 80. It is to be noted that any time delay in this bias, as developed by the full-wave rectifier, with reference to the signal appearing in the secondary winding of transformer 81, is compensated by delaying the last-named signal in the R. C. delay network 82, 83, 84, 85 already referred to.

If, on the other hand, the delay in delay line 61 corresponds substantially to the duration of video pulses to which it is desired that the system respond, the trailing edge of the undelayed pulse will correspond with the leading edge of the delayed pulse. The positive and negative pips resulting from differentiation of these trailing and leading edges will cancel out at the center tap of the primary winding of transformer 81, so that, during the interval of cancellation, no bias will be produced by the full-wave rectifier. There will then appear, in the output circuit of tubes 88 and 89, a composite pulse consisting of the added pips corresponding respectively to the trailing edge of the undelayed pulse and the leading edge of the delayed pulse.

The operation of the circuit, the arrangement of which has just been described, will perhaps be more clearly understood by reference to the waveforms shown in Figure 2. At A is represented a video pulse corresponding to a distinctive target object as supplied to differentiator 55, 58 and to the input of variable delay line 61. At B are represented the positive and negative pips resulting from the differentiation of the pulse shown at A, which will appear on the grid of tube 60. At C is shown the delayed received pulse appearing in the output circuit of delay line 61 when the delay is equal to the delay of the pulse shown at A. At D are shown the positive and negative pips corresponding to the leading and trailing edges of the delayed pulse shown at C. At E is shown the resultant of the addition of waveforms B and D such as will appear at the center tap on the primary winding of transformer 81, and in which the negative pulse of B cancels the positive pulse of D. At F is shown a pulse delayed by an amount less than the duration of the received pulse shown at A; and at G, the result of differentiating this pulse. Combining the waveform at B with that shown at G yields the waveform H, in which pips corresponding to both leading and trailing edges of both delayed and undelayed received pulses are present, and in which there is no cancellation. As a result, sufficient bias is developed on the grids of tubes 88 and 89 to cut them off at a time corresponding to the trailing edge of the received pulse A, and therefore no video output signal can result.

The pulse length discriminator described will function independently of the polarity of video input pulses, as will be apparent from a consideration of the detailed operation of the circuit. Furthermore, it will function satisfactorily to provide the desired selection even in the case where a plurality of pulses, whether equal or differing in duration, occur either partially or entirely contemporaneously. When this occurs for two pulses of somewhat different duration, the input to the discriminator will be a signal corresponding to the sum of two overlapping pulses of unequal duration as shown at K in Figure 2. Pips corresponding to the leading and trailing edges of both pulses will result from differentiation of the composite input pulse and responses will appear in the output of the discriminator whenever the pipe corresponding to the trailing edge of one of the component pulses corresponds with a pipe corresponding to the leading edge of its delayed counterpart. Thus pulse length discriminators in accordance with the invention, when used in a radar system, are capable of resolving and distinguishing between the superposed reflections from a number of different targets which, in addition, may be superposed on other land-mass and interference signals. In so doing they preserve intelligence as to the relative strengths of various target signals received and selected.

Although the circuit described is adapted to be used in a variety of ways in radar and related systems, it is particularly applicable in a variable duration pulse radar system of the sort shown and described in my copending application, Serial Number 682,741, filed July 11, 1946, now abandoned, in which such application is described in detail.

The invention, although it has been described with reference to but a single embodiment, is susceptible of other variations and modifications, such as will occur to those skilled in the art after reading this specification and which are regarded as being within the scope of the invention as defined by the appended claims. In particular, it is to be noted that the variable delay line 61 shown in Figure 1 may be replaced by a conventional fixed delay line wherever continuous variability is not desired and it is desired only to select pulses of duration between predetermined fixed limits.

I claim:

1. In an electrical signalling system, means supplied with an input signal for producing responses of differing polarity in response respectively to changes of different polarity in said signal, means producing other responses delayed by a predetermined amount with reference to said first-named responses and likewise differing in polarity, means combining said delayed and undelayed responses corresponding to the same change in said input signal in like senses so that, whenever the interval between a change in said input signal of one polarity and a subsequent change of opposite polarity substantially equals said response delay, the undelayed response, corresponding to said subsequent change, and the delayed response, corresponding to said initial change, tend to cancel in the resultant combined signal, and means supplied with responses from at least one of said first two means and controlled by said combined resultant signal to transduce said responses only during those intervals when there is substantial cancellation of the corresponding responses combined in said resultant signal.

2. In an electrical pulse signalling system, means producing responses of differing polarities corresponding respectively to and timed by the leading and trailing edges of pulse signals supplied to said system, means producing other responses delayed by a predetermined amount with reference to said first-named responses and likewise of differing polarities corresponding respectively to the leading and trailing edges of pulse signals to which they relate, means combining said delayed and undelayed responses corresponding respectively to said leading and trailing edges in like senses so that, whenever the duration of an input pulse substantially equals said response delay, the undelayed response, corresponding to the trailing edge of said pulse, and the delayed response, corresponding to the leading edge of said pulse, tend to cancel in the resultant combined signal, and means supplied with responses from at least one of said first two means and controlled by said combined resultant signal to transduce said responses only during those intervals when there is substantial cancellation of the corresponding responses combined in said resultant signal.

3. In an electrical pulse signalling system, means producing responses of differing polarities corresponding respectively to and timed by the leading and trailing edges of pulse signals supplied to said system, means producing other responses delayed by a predetermined amount with reference to said first-named responses and likewise of differing polarities corresponding respectively to the leading and trailing edges of pulse signals to which they relate, a vacuum tube stage having an input circuit supplied with responses from at least one of said means, having an output circuit and being normally operative to produce output responses corresponding to said input responses, means supplied with responses from both of said means, said last-named means being operative during the occurrence of a response from either of said first-named means non-simultaneously with a response from the other of said first-named means to develop a substantial bias and being operative during the occurrence of responses from both of said first-named means simultaneously to develop said bias, and means applying said bias to said vacuum tube stage, said bias being effective to render said stage inoperative to produce output responses corresponding to said input responses.

4. In an electrical pulse signalling system, means producing responses timed by the leading and trailing edges of pulse signals supplied to said system, means producing other responses delayed by a predetermined amount with reference to said first-named responses, a vacuum tube stage having an input circuit supplied with responses from at least one of said means and having an output circuit, means supplied with responses from both of said two first-named means, said last-named means being operative to develop a bias of predetermined value during the occurrence of said responses non-simultaneously and being operative to develop a bias of different value during the occurrence of said responses simultaneously, and means for applying said bias to said vacuum tube stage, said predetermined value of bias being effective to render said stage inoperative to produce output responses corresponding to said input responses and said different value of bias being effective to render said stage operative to produce output responses corresponding to said input responses.

5. In an electrical pulse signalling system, means producing responses of differing polarities corresponding respectively to and timed by the leading and trailing edges of pulse signals supplied to said system, means producing other responses delayed by a predetermined amount with reference to said first-named responses and likewise of differing polarities corresponding respectively to the leading and trailing edges of pulse signals to which they relate, means combining said delayed and undelayed responses corresponding respectively to said leading and trailing edges in like senses so that, whenever the duration of an input pulse substantially equals said response delay, the undelayed response, corresponding to the trailing edge of said pulse, and the delayed response, corresponding to the leading edge of said pulse, tend to cancel in the resultant combined signal, a vacuum tube stage having an input circuit supplied with responses from at least one of said means, having an output circuit and being normally operative to produce output responses corresponding to said input responses, a full-wave rectifier supplied with said resultant combined signal, said rectifier being operative to develop a substantial bias of predetermined polarity during the occurrence of said combined responses except during cancellation, and means applying said bias to said vacuum tube stage, said bias being effective to render said stage inoperative to produce output responses corresponding to said input responses.

6. In an electrical pulse signalling system, means producing responses of differing polarities corresponding respectively to and timed by the leading and trailing edges of pulse signals supplied to said system, means producing other responses of like polarity to and delayed by a predetermined amount with reference to said first-named responses, a pair of vacuum tubes, each having at least triode elements, means supplying responses from each of said means to the input circuit of a different one of said tubes, means coupled to the output circuits of both of said tubes for deriving a signal which is the sum of said response signals and for deriving separately a signal which is the difference of said response signals, a vacuum tube stage having an input circuit supplied with said difference signal and having an output circuit, and means utilizing said sum signal to control the ability of said vacuum tube stage to produce signals in said output circuit in response to the difference signals applied to said input circuit.

7. In an electrical pulse signalling system, means producing responses of differing polarities corresponding respectively to and timed by the leading and trailing edges of pulse signals supplied to said system, means producing other responses delayed by a predetermined amount with reference to said first-named responses and likewise of differing polarities corresponding respectively to the leading and trailing edges of pulse signals to which they relate, a push-pull vacuum tube stage having an input circuit supplied with responses from at least one of said means, having an output circuit and being normally operative to produce signals in said output circuit in response to said signals applied to said input circuit, means supplied with responses from both of said first-named means, said last-named means being operative during the occurrence of a response from either of said first-named means non-simultaneously with a response from the other of said first-named means to develop a substantial bias and being inoperative during the occurrence of responses from both of said first-named means simultaneously to develop said bias, and means applying said bias to said vacuum tube stage, said bias being effective to render said stage inoperative to produce signals in its output circuit in response to said signals applied to its input circuit.

8. In an electrical pulse signalling system, means differentiating pulses supplied to said system to produce responses of differing polarities corresponding respectively to and timed by the leading and trailing edges of said pulses, means delaying pulses supplied to said system, means differentiating said delayed pulses to produce other responses delayed by a predetermined amount with reference to said first-named responses and likewise of differing polarities corresponding respectively to the leading and trailing edges of pulse signals to which they relate, means combining said delayed and undelayed responses corresponding respectively to said leading and trailing edges in like senses so that, whenever the duration of an input pulse substantially equals said pulse delay, the undelayed response corresponding to the trailing edge of said pulse, and the delayed response corresponding to the leading edge of said pulse, tend to cancel in the resultant combined signal, and means supplied with responses from at least one of said first two means and controlled by said combined resultant signal to transduce said responses only during those intervals when there is substantial cancellation of the corresponding responses combined in said resultant signal.

9. In an electrical pulse signalling system, two sources of time-spaced pulse signals, at least some of the pulses from one of said sources occurring simultaneously with pulses from said other source, a vacuum tube amplifier having an input circuit and an output circuit, means for supplying pulses from at least one of said sources to said input circuit, separate means supplied with pulses from both of said sources for developing a bias in response to said pulses, the value of said bias being different depending upon whether or not the pulses from said two sources occur simultaneously or non-simultaneously, and means for applying said bias to said amplifier to control its gain, said bias produced in response to simultaneously occurring pulses being effective to produce substantially greater gain in said amplifier than said bias produced in response to non-simultaneously occurring pulses.

10. In an electrical pulse signalling system, two sources of time-spaced pulse signals, at least some of the pulses from one of said sources occurring simultaneously with pulses from said other source, means supplied with pulses from both of said sources, said means being operative in response to a pulse from either of said sources occurring non-simultaneously with a pulse from the other of said sources to develop a substantial bias and being inoperative in response to pulses from both of said sources occurring simultaneously to develop said bias, and said means inherently delaying the development of said bias with respect to the pulse in response to which said bias is developed, a vacuum tube stage having an input circuit and an output circuit, said stage being normally operative to produce signals in its output circuit in response to signals applied to its input circuit, means applying said bias to said vacuum tube stage, said bias being effective to render said stage inoperative to produce signals in its output circuit in response to signals applied to its input circuit, and means including a signal delay device supplying pulses from at least one of said sources to said input circuit, the delay introduced by said means being comparable to that inherent in said bias developing means.

References Cited in the file of this patent

UNITED STATES PATENTS

| Number | Name | Date |
|---|---|---|
| 2,211,942 | White | Aug. 20, 1940 |

FOREIGN PATENTS

| Number | Country | Date |
|---|---|---|
| 528,192 | Great Britain | Oct. 24, 1940 |